INVENTORS
CHRISTOPHER SNELLING
CAROL K. KELLER
BY STEPHEN F. ROYKA

ATTORNEY

United States Patent Office 3,647,659
Patented Mar. 7, 1972

3,647,659
PHOTOELECTROPHORETIC IMAGING PROCESS WHEREIN THE IMAGING ELECTRICAL FIELD IS APPLIED SUBSEQUENT TO IMAGEWISE EXPOSURE
Carol K. Keller, Rochester, Stephen F. Royka, Fairport, and Christopher Snelling, Penfield, N.Y., assignors to Xerox Corporation, Rochester, N.Y.
Filed Oct. 29, 1969, Ser. No. 872,174
Int. Cl. G03g 13/22; B01k 5/00
U.S. Cl. 204—181
6 Claims

ABSTRACT OF THE DISCLOSURE

A photoelectrophoretic imaging system wherein a suspension of electrically photosensitive particles in an insulating liquid migrate in image configuration when exposed to imagewise light and, subsequently, to electrical field. Separation of the exposing and field application steps is made possible by coating the suspension on an electrode using a biased coating member or by application of corona to the surface of the suspension just prior to the imagewise exposure step. Subsequent application of field then causes imagewise particle migration.

BACKGROUND OF THE INVENTION

This invention relates in general to imaging systems and more specifically to improved photoelectrophoretic imaging systems.

A photoelectrophoretic imaging system has recently been developed capable of producing colored images which utilizes electrically photosensitive particles. This process is described in detail and claimed in U.S. Pats. 3,383,993 to Shu-Hsiung Yeh, 3,384,565 to V. Tulagin et al. and 3,384,566 to H. E. Clark, all issued May 21, 1968. In such an imaging system variously colored light absorbing particles are suspended in a non-conductive liquid carrier. The suspension is placed between electrodes subjected to a potential difference and exposed to an image. When these steps are completed, selective particle migration takes place in image configuration providing a visible image at one or both of the electrodes. In a monochromatic system a single colored image analogous to conventional black and white photography is produced. In a polychromatic system natural color images may be produced by using mixtures of particles of two or more different colors which are each sensitive only to light of a specific wavelength or narrow range of wavelengths.

In order to obtain images of optimum quality the potential applied across the imaging suspension between the electrodes is conventionally on the order of several thousand volts. This high potential is maintained between a pair of electrodes one of which preferably is conductive called the "injecting" electrode and the other of which has preferably an insulating surface backed by a conductive core called the "blocking" electrode. Ordinarily, one of these electrodes is transparent and the image to be reproduced is projected onto the imaging suspension through the transparent electrode. The electrodes are then brought into contact with the suspension while the potential is imposed between them during exposure.

The prior art process as described above produces high quality color images. However, several disadvantages are apparent in the prior art process. For example, in the prior art process, it is necessary to have field applied during the imaging exposure. It was, therefore, conventional to use a transparent conductive electrode which was at least as large as the desired image. Conductive transparent materials are expensive and usually fragile. In addition, because a field was present at the time of exposure, particle migration or development began immediately upon exposure to activating electromagnetic radiation.

Therefore, it was not possible to sequentially expose selective portions of the imaging suspension and then to develop the resulting image.

Copending application Ser. No. 675,864 describes one method for overcoming the above problems. The process described therein utilizes particles which once exposed to electromagnetic radiation remain capable of exchanging charge with an electrode for a limited time after exposure is terminated. Few of these materials, however, have been found.

SUMMARY OF THE INVENTION

It is, therefore, an object of this invention to provide a photoelectrophoretic imaging system which overcomes the above noted disadvantages.

It is another object of this invention to provide a photoelectrophoretic sequential exposure imaging system capable of producing relatively high quality images.

It is another object of this invention to provide a photoelectrophoretic imaging system wherein full frame exposure of relatively short duration may be used.

It is another object of this invention to provide a photoelectrophoretic imaging system which does not require the use of relatively large conductive transparent electrodes.

It is another object of this invention to provide an imaging system which will produce either a positive or a negative image on either electrode.

It is another object of this invention to provide a photoelectrophoretic imaging system wherein field application is not required during the exposure step.

It is another object of this invention to provide a relatively simple non-complex photoelectrophoretic imaging system.

It is another object of this invention to provide a photoelectrophoretic imaging system which can use any electrically photosensitive particles without the necessity of applying field and electromagnetic radiation simultaneously.

The foregoing objects and others are accomplished in accordance with this invention by providing photoelectrophoretic imaging system wherein a suspension of electrically photosensitive particles in an insulating carrier liquid is deposited using a biased member onto a preferably conductive substrate, subsequently exposed to activating electromagnetic radiation in image configuration and subsequently developing the image by applying a field across the imaging suspension. Although the theory of operation of this invention is not fully understood apparently the biased application or deposition of the imaging suspension or charge applied to the suspension after deposition renders the particles capable of selective migration in image configuration in response to a field applied a significant period of time after the particles have been exposed to electromagnetic radiation. The effect also appears to apply to all electrically photosensitive particles. As long as a five minute interval may be allowed between the exposure and development step with no discernible deterioration in image quality.

Since it is no longer necessary to apply field while exposing the suspension to radiation, greatly simplified process steps and apparatus may be utilized.

Conventionally, the image formed is transferred to a receiving sheet and fixed thereon for further use and viewing. Since a negative image is formed on one of the electrodes and a positive image is formed on the other, it is possible to use either image particularly for monochrome images. The image may be fixed in place by spraying a binder on it, laminating an overlay on it, or by including a binder in solution in the liquid suspending medium. The image is preferably transferred from the reuseable electrode and fixed on another surface so that the electrode may be reused. Such a transfer step may be carried out by adhesive pickoff with an adhesive tape such as Scotch Brand Cellophane Tape or preferably, by electrostatic field transfer. Electrostatic transfer may, for example, be carried out by carrying out the imaging procedure described and then passing a second roller over the particle image formed on the injecting electrode holding the second roller at a potential opposite in polarity to that of the first electrode. If the transfer roller is covered with a paper sleeve, this paper will pick up the complete image as the electrode rolls over the injecting electrode. In addition, the particles may include a component that may be made tacky by the application of heat or a properly selected solvent so that either of these can be used to adhere and fix the particle image to the electrode or to a transfer surface.

The blocking electrode surface or image developing electrode surface may be made of any suitable insulating material. Typical insulating materials include: insulating rubber, baryta paper, cellulose acetate, polyethylene coated paper, nitro cellulose, polystyrene, polytetrafluoroethylene, polyvinylfluoride, polyethylene terephthalate and mixtures thereof. Du Pont Tedlar polyvinylfluoride film is preferred because it combines high dielectric constant with high dielectric strength and is easy to clean.

The second electrode may be made of any conductive electrode material. Typical conductive electrode materials include: metal surfaces such as aluminum, brass, stainless steel, copper, nickel, zinc, etc., conductively coated glass, such as tin or indium oxide coated glass, aluminum coated glass, similar coatings on plastic substrates, rubber rendered conductive by inclusion of a suitable material therein, or paper rendered conductive by inclusion of a suitabe chemical therein, or through conditioning in a humid atmosphere to insure the presence therein of sufficient water content to render the material conductive. Aluminum is preferred because it is an excellent conductor and is relatively inert.

Any suitable highly colored electrically photosensitive particle or mixtures of such particles may be used in carrying out the invention, regardless of whether the particular particle selected is organic or inorganic and is made up of one or more components in solid solution or dispersed one in the other or whether the particles are made up of multiple layers of different materials or are combinations of photosensitive and non-photosensitive materials.

The imaging suspension may comprise any suitable electrically phohosensitive particles dispersed in a carrier liquid and may be of two or more colors. Typical electrically photosensitive particles and carrier liquids are disclosed in U.S. Pat. 3,384,488, issued May 21, 1968 to V. Tulagin et al. and U.S. Pat. 3,357,989 issued Dec. 12, 1967 to J. F. Byrne et al., the disclosures of which are incorporated herein by reference. The "X"-form of phthalocyanine is preferred for monochrome imaging because of its high sensitivity.

The imaging suspension may be coated on an electrode and the biased member brought into charging contact with the suspension or the biased member may be used to apply the imaging suspension.

By biased member is meant a source of corona or members such as plates, brushes, doctor blades or rollers which may also be used to deposit the imaging suspension prior to imagewise exposure. A conductive roller having an insulating surface is preferred for depositing the suspension. Although the same roller could be used to provide the image developing field it is preferred to use a separate electrode also having an insulating surface which is referred to herein as the blocking or development electrode.

It is also possible to provide a photoconductive "injecting" electrode which provides certain advantages which may be explained as follows. In light struck areas it is desirable that particles exchange charge with an electrode hence a conductive electrode is preferred in light struck areas. However, in dark areas it is preferred not to have particle exchange hence an insulating layer is preferred in dark areas. A photoconductive electrode provides these characteristics in that being a photoconductor the layer will be insulating in dark areas and a conductor in light struck areas. The photoconductor may be placed on a transparent conductive substrate and the imaging suspension illuminated therethrough or the photoconductor may be illuminated through the imaging suspension.

Any suitable photoconductor may be used. Typical photoconductors include inorganic photoconductors such as zinc oxide, calmium sulfide, zinc sulfide, lead sulfide, cadmium selenide, selenium, and mixtures thereof; organic photoconductors such as phthalocyanine binder plates, anthraquinones, quinacridones and mixtures thereof. Phthalocyanines are preferred because of their high sensitivity and stability in the process.

Further, in prior art photoelectrophoretic imaging it was conventional to obtain a positive image on the injecting electrode through which exposure had been made. In accordance with this invention the positive image may be formed on either electrode. For example, assume the depositing roller is charged negatively with respect to the injecting electrode. Development of the image with a blocking electrode held to a negative potential forms a positive image on the injecting electrode and a negative image on the blocking electrode. By making the blocking electrode positive with respect to the injecting electrode a positive image may be formed on the blocking electrode and a negative image formed on the injecting electrode. With different pigments the polarities may be the reverse of those given above which are applicable to the pigments used in the specific examples which follow.

BRIEF DESCRIPTION OF THE DRAWINGS

The advantages of this improved method of photoelectrophoretic imaging will become apparent upon consideration of the detailed disclosure of the invention especially when taken in conjunction with the accompanying drawings wherein.

The figures are side sectional views of a simple exemplary photoelectrophoretic imaging system showing the various process steps of the invention.

Electrodes 1 and 3 are connected to a source of D.C. potential 9 which applies a potential difference across imaging suspension 5 as roller 3 traverses electrode 1.

Figure 1:
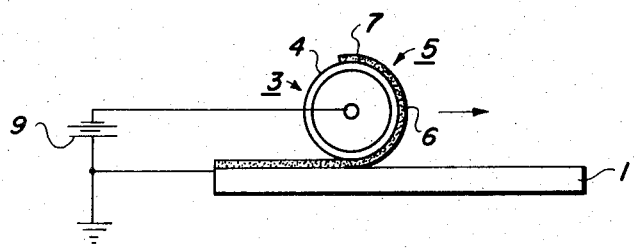
Referring now to FIG. 1 there is seen injecting electrode 1 which in this exemplary instance is aluminum. Roller 3 which has an insulating surface 4 has coated thereon an imaging suspension generally designated 5 which comprises electrically photosensitive particles 6 dispersed in an insulating carrier liquid 7. Imaging suspension 5 may be provided on either electrode 3, electrode 1 or both and may be sprayed, painted, or applied using a doctor blade or inking roller or other suitable method.
Figure 2:
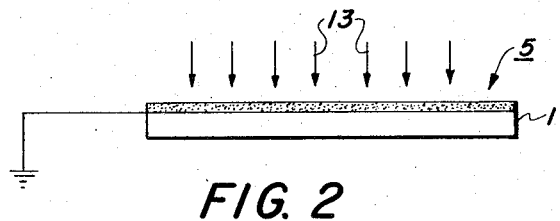

Referring now to FIG. 2 after the biased depositing of imaging suspension 5 is complete suspension 5 is exposed to activating electromagnetic radiation. Where a monochrome image is desired the electrically photosensitive particles may be of one color or a plurality of colors which respond to the activating electromagnetic radiation used. For full color imaging cyan, yellow and magenta particles are used each of which respond to selected wavelengths only.

Figure 3:
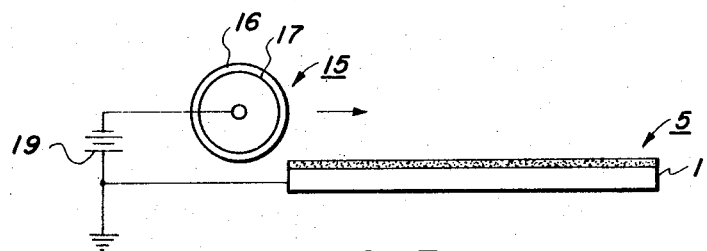

Referring now to FIG. 3 after imagewise exposure is terminated, blocking electrode generally designated 15 which is made up of outer insulating layer 16 which may be Tedlar, for example, and conductive center core 17 connected to a source of D.C. potential 19 is rolled across imaging suspension 5 applying a potential across suspension 5. A negative or positive image may be formed on the electrode as explained above.

DESCRIPTION OF PREFERRED EMBODIMENTS

The following examples further specifically illustrate the present invention. The examples below are intended to illustrate various preferred embodiments of the improved imaging method. The parts and percentages are by weight unless otherwise indicated. In all of the examples which follow apparatus of the general type illustrated in the drawings is used.

EXAMPLE I

An imaging suspension comprising about 1 part of a cyan pigment, Monolite Fast Blue GS the alpha form of metal-free phthalocyanine, C.I. No. 74100, available from Arnold Hoffman Co.; about 6 parts of a magenta pigment, Bonadur Red B, 1-(4'-chloro-5-ethyl-2'-sulfonic acid) azobenzene-2-hydroxy-3-naphthoic acid available from American Cyanamid; and about 6 parts of a yellow pigment -N-2''-pyridyl-8,13-dioxodinaphtho-(2,1-b; 2',3'-d)-furan-6-carboxamide dispersed in about 100 parts of Sohio Odorless Solvent 3440 is prepared and coated onto an about 2½" diameter aluminum roller having a Tedlar film covering. A source of 3000 volts D.C. is connected to the aluminum roller and an aluminum plate. The roller made negative with respect to the plate. The plate is connected to ground. The roller is then caused to traverse the plate in pressure contact. A coating of the imaging suspension is thus applied to the plate.

The imaging suspension is then exposed to a full color image utilizing a 3200° K. lamp, a Kodachrome natural color transparency and a lens. Imagewise illumination is continued for about one second. Exposure is then terminated. A 2½" aluminum roller with a Tedlar film on its surface is then immediately rolled across the imaging suspension in pressure contact while a potential of approximately 3000 volts D.C. is applied between the blocking electrode and the plate, the roller being negative with respect to the plate. A positive full color image is found adhering to the surface of the injecting electrode plate. This image is transferred by pressure contact to paper providing a high quality full color image corresponding to the original.

EXAMPLE II

The experiment of Example I is repeated except that approximately 5 minutes is allowed to elapse between the exposing and developing pass. A high quality image comparable to Example I is obtained.

EXAMPLE III

The experiment of Example I is repeated except that the blocking electrode is held at a positive 3000 volts with respect to the injecting electrode. A full color positive image is found adhering to the blocking electrode. This image is transferred electrostatically to paper providing a high quality full color image corresponding to the original.

EXAMPLE IV

The experiment of Example III is repeated except that approximately 5 minutes is allowed to elapse between the exposing and developing steps. Results similar to Example III are obtained.

EXAMPLE V

An imaging suspension comprising about two parts Monolite Fast Blue; about one part of a magenta pigment, Watchung Red B, 1-(4'-methyl-5'-chloro-2'-sulfonic acid) axobenzene-2-hydroxy-3-naphthoic acid and about one part of the yellow pigment of Example I dispersed in about 100 parts of Sohio Odorless Solvent 3400 is prepared. The experiment of Example I is repeated using the imaging suspension of this example. A full color image is again formed corresponding to the original.

EXAMPLE VI

The experiment of Example II is repeated using the imaging suspension of Example V. A full color positive image is again formed on the injecting electrode.

EXAMPLE VII

The experiment of Example III is repeated using the imaging suspension of Example V. A full color positive image is found adhering to the surface of the Tedlar.

EXAMPLE VIII

The experiment of Example IV is repeated except that an imaging suspension prepared as in Exampl V is used. A full color positive image is found adhering to the surface of the blocking development electrode.

EXAMPLE IX

In this experiment the deposition bias is applied by a corona discharge.

An imaging suspension is prepared by suspending approximately seven parts of Monolite Fast Blue GS in about 100 parts Sohio. The suspension is coated onto an aluminum plate. A corona charging device with a wire potential of about +7000 volts with respect to ground potential is passed over the suspension. The suspension is then exposed to light projected through a black and white transparency. The image is then developed as in Example I using a 1500 volt D.C. potential instead of the 3000 used in Example I. A high quality positive image is found adhering to the injecting electrode and a high quality negative image is found adhering to the developing roller. By reversing the polarity during the developing step the negative high quality image remains on the injecting electrode and the positive high quality image is found on the blocking electrode.

In all of the above examples a complementary negative image is formed on the electrode opposite the electrode on which the positive image is formed. This provides, particularly for monochrome images, either right reading or wrong reading positive or negative images directly by changing polarities and transferring from the suitable electrode.

Although specific components and proportions have been stated in the above description of preferred embodiments of the invention, other typical materials as listed above if suitable may be used with similar results. In addition, other materials may be added to the suspension to synergize, enhance, or otherwise modify the properties of the imaging layer. For example, a plastic component could be added to the suspension which on evaporation of the carrier liquid would coat the final images produced.

Other modifications and ramifications of the present invention will occur to those skilled in the art upon a reading of the present disclosure. These are intended to be included within the scope of this invention.

What is claimed is:

1. The method of photoelectrophoretic imaging comprising in order the steps of:
    (a) providing a layer of an imaging suspension comprising electrically photosensitive particles dispersed in an insulating liquid;
    (b) applying bias to said imaging suspension;
    (c) exposing said suspension to a pattern of activating electromagnetic radiation; and subsequently,
    (d) applying an electrical field across said imaging suspension until an image is formed.

2. The method of claim 1 wherein said bias is applied by a corona discharge device.

3. The method of claim 1 wherein said suspension is provided on the surface of a first electrode and said bias is applied by contacting said suspension with a second electrode and applying a potential difference between said first and second electrodes.

4. The method of claim 1 wherein said suspension is provided on the surface of an opaque electrode and said exposure occurs other than through an electrode.

5. The method of claim 1 wherein substantially all of said electrically photosensitive particles are responsive to said activating electromagnetic radiation and a monochrome image is formed.

6. The method of claim 1 wherein said electrically photosensitive particles are of at least two colors and are responsive to at least two different wavelengths of said activating electromagnetic radiation and a polychromatic image is formed.

References Cited

UNITED STATES PATENTS

| | | | |
|---|---|---|---|
| 3,384,566 | 5/1968 | Clark | 96—1.3 |
| 3,427,242 | 2/1969 | Mihaslov | 204—181 X |

GEORGE F. LESMES, Primary Examiner

R. E. MARTIN, Assistant Examiner

U.S. Cl. X.R.

96—1, 1.3,, 1.4; 204—180